July 17, 1962  K. ANKE ET AL  3,044,704
ANALOG COMPUTER FOR EXPERIMENTAL INVESTIGATION
OF CONTROL AND REGULATING SYSTEMS
Filed Oct. 17, 1958

3,044,704
ANALOG COMPUTER FOR EXPERIMENTAL INVESTIGATION OF CONTROL AND REGULATING SYSTEMS
Klaus Anke, Claus Kessler, and Dieter Ströle, Erlangen, Germany, assignors to Siemens-Schuckertwerke Aktiengesellschaft, Berlin-Siemensstadt, Germany, a corporation of Germany
Filed Oct. 17, 1958, Ser. No. 767,982
Claims priority, application Germany Oct. 19, 1957
22 Claims. (Cl. 235—184)

Our invention relates to analog computers in which the performance of a controlling or regulating system is simulated by a model composed of electric circuit components and into which the operational data, such as datum values and error signals, are fed in form of electric voltages or currents in order to produce an electric output whose behavior is indicative of the system performance being investigated.

The work required for solving theoretical problems arising in regulatory systems and the planning of industrial control or regulating installations often involve equations whose solution requires time-consuming and difficult activities. Some of the difficulties can be circumvented by linearizing the component problems to as great an extent as compatible with the degree of accuracy required. But even then, many problems remain complicated and demand longwinded calculations such as may result from the necessity of varying a number of different parameters or considering the inter-meshing of regulatory circuits. Notable among the calculating devices heretofore used for such purposes are those of the above-mentioned analog type, and such computers for use in control and regulatory engineering are on the market in different designs and sizes.

The known computers of this type are based upon one or the other of two divergent design principles. According to one, the computer is provided with amplifiers which are to be connected by external and selectively applicable wiring with variable resistors, capacitors and other circuit components, the components and the wiring being properly chosen for each particular problem being investigated. This has the advantage of universal applicability but results in intricate extraneous circuit connections. According to the other design principle of the known analog computers for regulatory problems, a number of analog units are used, each having an amplifier with fixedly wired feedback circuits, only one characteristic magnitude being adjustable in each unit. This results in simplified and synoptical extraneous connections but involves a much greater expenditure in equipment.

It is an object of our invention to devise an analog computer for experimental investigation of control and regulatory systems that avoids the shortcomings of the above-mentioned known computers and combines and further improves their respective advantages.

According to the invention, we compose the analog computer of a number of modular model units, all built up from identical circuit components and each simulating one functional element of a control or regulating system to be investigated. Each of these model units is equipped with a mounting structure which carries an amplifier and adjustable impedance devices, preferably a set of selectively applicable resistors jointly adjustable by frontally accessible manual means and a set of selectively applicable capacitors similarly adjustable. The structure further carries input terminals, output terminals and a connector or socket field of the multiple type, all accessible from the outside and electrically connected with the above-mentioned built-in circuit components of the model unit. We further provide a number of function plugs for simulating respectively different performance characteristics. These plugs are selectively insertable, one at a time, in the above-mentioned connector or socket field of the mounting structure and, when so inserted, interconnect the circuit components on the mounting structure in accordance with the functional characteristics of the one system element whose static and dynamic behavior is simulated by electric devices mounted on the selected plug. Accordingly, each of the function plugs contains impedance means which, when the plug is inserted, are connected with the amplifier and with the adjustable impedance devices of the mounting structure. The selected function plug then determines the qualitative behavior of the system element, whereas the adjustable impedance devices of the model unit determine the quantitative behavior. All mounting structures have the same size and the same interwiring of the circuit components mounted thereon, and the model units are interconnectable in a selected number and by selected external connections attached to the above-mentioned accessible input and output terminals.

By virtue of the invention, a particularly synoptical or even visually available model of the regulating problem to be investigated is provided. Since all model units are identical and do not possess any interior wiring applicable only to an individual problem of investigation, these model units are readily available for any desired simulation. Consequently the limitation imposed upon the applicability of the known amplifier units with fixed internal wiring, as heretofore used for analog computation of regulating problems, is avoided.

The above-mentioned amplifiers in model units according to the invention are preferably symmetrical transistor amplifiers which occupy little space and permit representing any individual electrical magnitude, as desired, with either the positive or negative sign of polarity. That is, if a reversal in the sign is needed, it is merely necessary to reverse the poling of the external connecting leads. Of further advantage is the low power level and the elimination of the heating-up period afforded by such amplifiers.

The above-mentioned and further objects, advantages and features of our invention will be apparent from, and will be set forth in, the following with reference to the drawings showing embodiments of the invention by way of example. On the drawing:

FIGS. 10a to 12a are respective explanatory diagrams relating thereto.

FIG. 13 shows in perspective a function plug exhibiting a functioning diagram corresponding to FIGS. 6 and 6a.

The same reference characters and symbols are used in all illustrations for the same respective elements.

Figure 1:
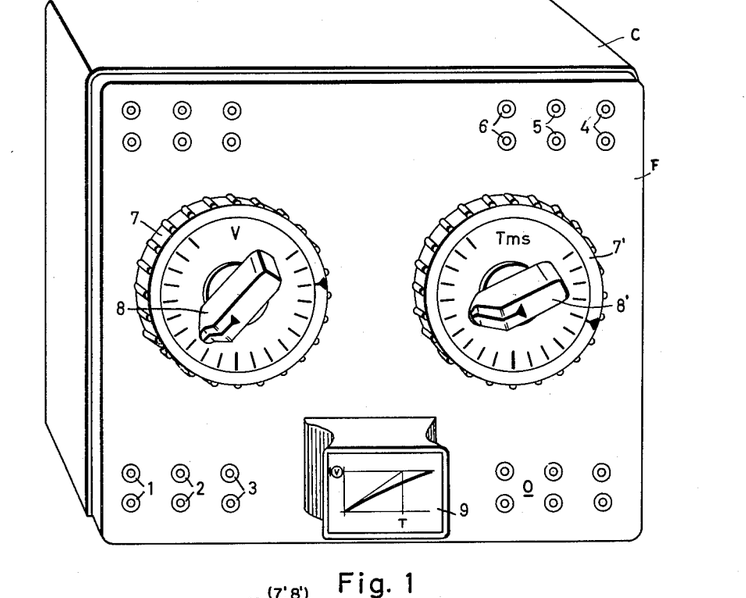
FIG. 1 is a perspective front view of one of the model units of the analog computer, the unit being provided with one of the available variety of exchangeable function plugs.

Referring to the front view of one of the model units shown in FIG. 1, the front panel F of the housing is provided in the left lower corner with several two-pole input terminals 1, 2, 3 in form of plug-in sockets, and is provided in its right upper corner with additional two-pole input sockets 4, 5 and 6. The two-pole output terminals of the model unit also consist of sockets which are located in the upper left corner and lower right corner and are denoted by O. The input terminals 2, 3, 5 and 6 are in permanent electric connection with a transistor amplifier 12 (FIGS. 2, 3) through fixed standard resistors 17, 18 and are available for feeding several input magnitudes into the amplifier. In contrast thereto, the input terminals 1 and 4 are not permanently connected with the amplifier but become connected therewith through selected impedance devices when the function plug 9, described below, is inserted. For example, in the embodiment of FIG. 2 the two input terminals 1 are shown connected through adjustable resistors 10 and 11 with the input terminals of the amplifier 12. Only one of the two-pole input terminals 1 and 4 is to be used at a time. The pairs of output terminals O are all parallel connected to the output side of the amplifier 12.

Figure 2:
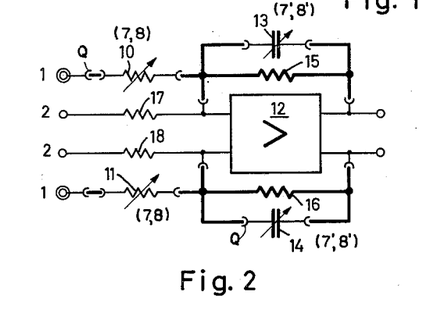
FIG. 2 is an electric circuit diagram of the same model unit including the same function plug.
Figure 3:
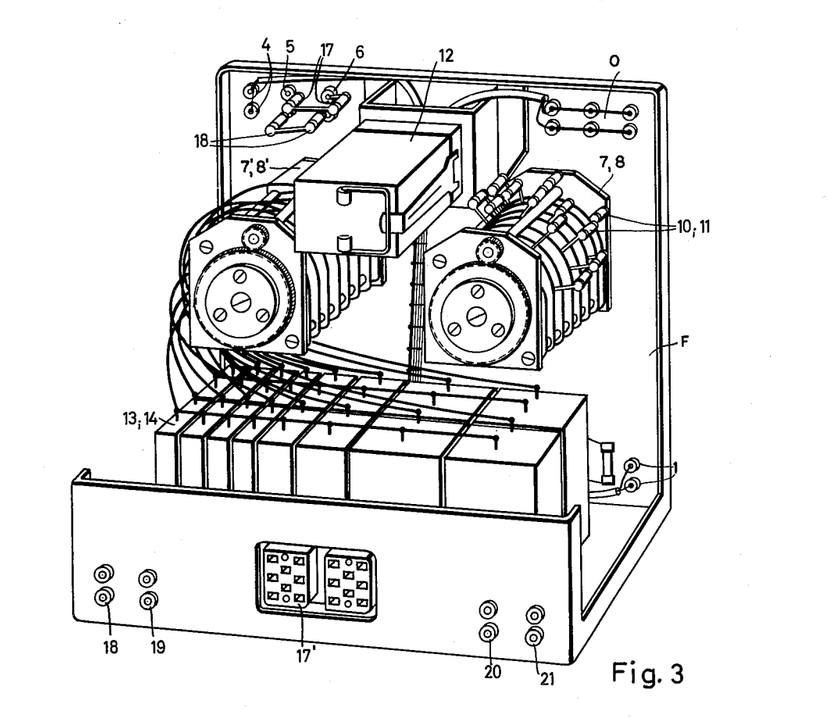
FIG. 3 is a perspective rear view of the same model unit.

The middle portion of the front panel F is provided with two step-type selector switches 7, 8 and 7', 8'. Switch 7, 8 serves for selectively adjusting a static magnitude having the character of amplification which is indicated by the letter V. The right-hand switch 7', 8' serves for adjusting a dynamic magnitude having the character of a time constant which is indicated by the letter T. The switches have a decadic subdivision, one decade being switched by means of a ring member 7, 7' and the other decade by a knob 8, 8'. The switch 7, 8 serves for adjusting the above-mentioned variable resistors 10, 11 (FIGS. 2, 3). The switch 7', 8' is connected with a battery of capacitors 13, 14 (FIGS. 2, 3) and serves for setting the effective total capacitance value.

The above-mentioned function plug 9 has a housing which encloses the electric circuit components of the plug. The bottom of the plug carries a number of plug pins engageable with the respective sockets of a connector field mounted on the front plate F. While in FIG. 1 this socket field of front plate F is covered by the plug 9, the field is apparent from FIG. 17 where it is denoted as a whole by P. A total of 24 sockets are indicated at P in FIG. 17, this number being sufficient for all occurring computer problems as described hereinafter. It will be understood that the totality of available connections for the function plug are not always used at a time. For example, in FIG. 2 the plug connections made by the function plug are indicated by small semicircles such as those denoted by Q, and it will be recognized that for the particular problem involved in FIG. 2 a total of 14 such plug connections are in use while the others are idle.

Figure 2A:
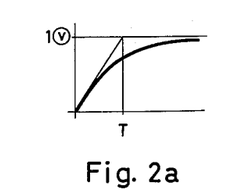
FIG. 2a is a coordinate diagram of the particular function performed or simulated by the plug components.

The front surface of the function plug 9 is provided with a diagram of the transitory function or characteristic (transfer function) which is imparted to the model unit by the particular function plug being used. The characteristic thus indicated on plug 9 in FIG. 1 and separately shown in FIG. 2a has the character of "inertia" involving a time constant T and an amplification V. The amplification has the value 1 for the input terminals 2, 3, 5 and 6 which, as shown in FIG. 2 for terminal 2, are permanently connected with the input circuit of the amplifier 12 through resistors 17, 18. For the input terminals 1 and 4 however, the amplification is adjustable and has the value selected by means of switch 7, 8. The fact that the amplification for terminals 1 and 4 is to be adjusted can be indicated by giving these particular inputs as well as the corresponding representation on the front of the function plug 9 a characterizing color, for instance the color red. In FIGS. 1, 2 and 2a this is indicated by surrounding the terminals 1 as well as the character V by a circle. The time constant T is set by means of the switch 7', 8'.

In the circuit diagram of FIG. 2, corresponding to the function plug 9 in FIG. 1 and to the characteristic shown in FIG. 2a, the resistors 15 and 16 mounted in the housing of the plug 9 as well as all connecting leads located in the plug are shown by heavier lines than the resistors and components mounted on the mounting structure, including the front plate F, of the model unit; it being understood that the capacitors 13 and 14 connected with the switch 7', 8' are likewise attached to the mounting structure of the unit.

It will be recognized from FIG. 2 that the function plug "inertia" connects the input terminals 1 (terminals 4 could have been chosen instead) with the adjustable resistors 10, 11 that are controllable by the switch 7, 8. The same plug applies to amplifier 12 a feedback counter-coupling consisting of the adjustable capacitors 13, 14 controlled by the switch 7', 8' and of the resistors 15, 16 contained in the function plug. For simplifying the circuit diagram, FIG. 2 shows only the input terminals 1 and 2 that are active when the plug "inertia" is being used, but omits the inactive terminals 3, 4, 5 and 6.

In the rear view of FIG. 3 the cover portion C (FIG. 1) of the mounting structure is removed in order to expose the arrangement and wiring of the built-in circuit components. The transistor amplifier 12 is enclosed in a can. As explained, the selector switch 7, 8 is connected with the fixed resistors 10, 11 and the switch 7', 8' is connected with the capacitors 13, 14. The rear wall of the structure carries a plug-in connector 17' for connection to a power supply, and a number of additional plug-in sockets 18', 19, 20, 21 which permit enlarging the range of adjustment of the characteristic magnitudes controlled by the switches 7, 8 and 7', 8'. For example, additional circuit components, particularly capacitors, can be connected to the auxiliary sockets 18', 19, 20 and 21 to be used in addition to the capacitors 13 and 14. Visible in the upper portion of the front panel F are the input terminals 4, 5 and 6, and in the lower portion the input terminals 1. As mentioned, the terminals 1 (or 4) are connected with the resistors 10, 11 only if a corresponding function plug, such as the "inertia" plug according to FIG. 2, is being used, whereas the input terminals 5 and 6 are in permanent connection with the resistors 17 and 18.

As apparent from FIG. 2, the input circuit for adjustable amplification and the counter feedback circuit of the amplifier 12 are completed by the leads and circuit components of the function plug depending upon the particular transition characteristic to be imparted to the model unit. The function plugs can be manufactured with a great variety of internal components and connections so that each regulator model unit can be given a different static and dynamic behavior simply by selecting the proper function plug. For example, the characteristic of integrators, follow-up regulator members, integral-action regulators and derivative-action (rate action) regulators can thus be simulated.

FIGS. 4 to 7 illustrate a variety of internal circuit connections of respective function plugs which are thus applicable with any of the model units in order to impart to them respectively different characteristics. Generally, the particular circuit connections shown are known as such, except for the particular separation employed for the purposes of the invention and the particular connection of the exchangeable plug components with the socket field of the model unit. This separation and connection will be described in the following. For that purpose, in all illustrations of FIGS. 2 and 4 to 7 the plug-in connections through the socket field of the model unit are indicated by small semicircles corresponding to those denoted by Q in FIGS. 2 and 4, and the circuit components and connecting leads within each function plug are shown by heavy lines. The capacitors and resistors contained in the mounting structure of the model unit are denoted by the same reference characters as in FIG. 2.

Figures 4, 4A:
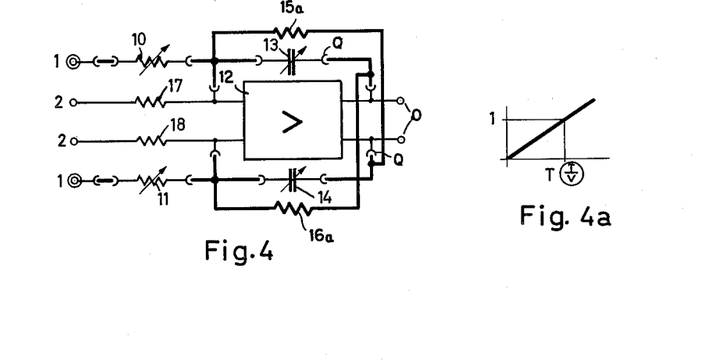
FIGS. 4 to 9 are schematic circuit diagrams of six other function plugs for performing or simulating a corresponding number of the respectively different functions represented in FIGS. 4a to 9a by coordinate diagrams.

The circuit diagram according to FIG. 4 represents an integrator. When this plug is inserted into the model unit, the adjustable resistors 10 and 11 are connected in series with the input circuit of the amplifier 12, and the adjustable capacitors 13 and 14 are connected as counter feedback impedances between the output and input side of the amplifier. The function plug contains additional resistors 15a, and 16a which are connected between output and input circuits of the amplifier to form an inertia-free coupling. The characteristic imparted to the model unit by the function plug according to FIG. 4 is linear as shown in FIG. 4a.

Figure 5:
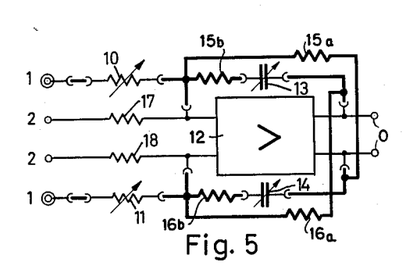
Figure 5A:
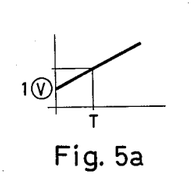

The circuit diagram of an IP-regulator shown in FIG. 5 and resulting in the characteristic according to FIG. 5a, is similar to that of FIG. 4, except that the plug is provided with two further resistors 15b and 16b which are connected in series with the adjustable capacitors 13 and 14 and form RC-members together therewith.

Figure 6:
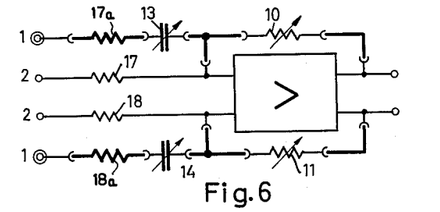
Figure 6A:
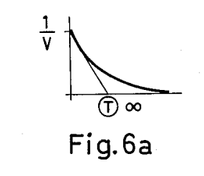

For producing a yielding or drooping characteristic according to FIG. 6a, the function plug shown in FIG. 6 connects the adjustable resistors 10 and 11 as counter feedback resistors between output and input sides of the amplifier, and connects the capacitors 13 and 14 as input-circuit impedances for the amplifier. The function plug further contains two resistors 17a and 18a which impart RC character to the input impedance of the amplifier.

Figure 7:
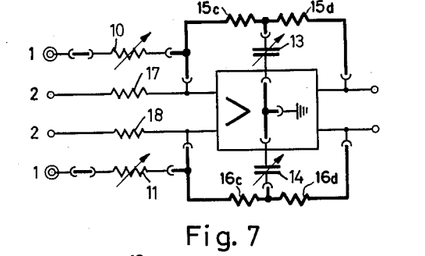
Figure 7A:
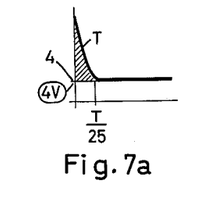

The circuit diagram of the function plug shown in FIG. 7 represents a PD-regulator according to the characteristic shown in FIG. 7a. The plug connects the resistors 10 and 11 in the input circuit of the amplifier. The capacitors 13 and 14 are connected by the plug to form the discharge or grounding impedances of respective T-members whose resistors 15c, 15d and 16c, 16d are contained in the plug. The midpoint of capacitors 13, 14 is grounded by the function plug.

In the transition characteristics shown in FIGS. 4a to 7a, the markings surrounded by a circle appertain to the input terminals 1 or 4, the other markings being assigned to the remaining input terminals. For example according to FIG. 4a, the period of time within which the integrator attains the output value "1" is determinable for the input terminals 1 or 4 as the quotient of the selected adjustments T and V, but is determinable for the other input terminals only by adjusting T.

It will be recognized from FIGS. 4a to 7a that there are two variable parameters for each function, namely a static parameter adjustable by means of the selector switch 7, 8 that determines the amplification factor V, and a dynamic parameter adjustable by means of the switch 7', 8' that determines the time constant T.

The function plugs so far described result in a linear or continuous behavior of the model unit. According to another feature of our invention, however, it is also possible, to some extent, to form non-linear or discontinuously operating elements by using particular function plugs together with the above-described design and wiring of the built-in components mounted on the mounting structure of the model units. For example, such additional function plugs may be designed to represent the functions "rectangular-wave generator," "rectifier," "saturation," "two-point regulator" and "three-point regulator." The circuit diagrams for such function plugs will be described presently with reference to FIGS. 8 to 12.

Figure 8:
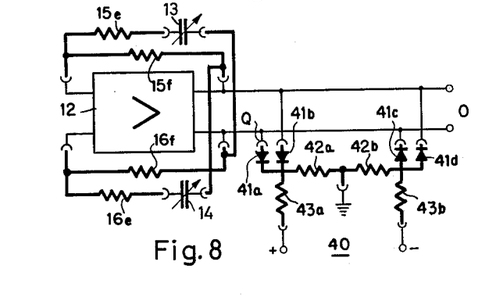
Figure 8A:
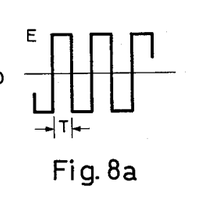

FIG. 8 shows the circuit diagram of a square-wave generator in which the function plug supplements the adjustable capacitors 13 and 14 by series-connected resistors 15e and 16e and connects them in feedback coupling circuits of the amplifier 12. The function plug further contains resistors 15f and 16f which provide a counter coupling for the amplifier. The output circuit of the amplifier 12 is further connected with an amplitude limiting device 40 which comprises four asymmetrical conductors or valves, such as half-wave rectifiers, denoted by 41a, 41b, 41c, 41d and four resistors 42a, 42b, 43a, and 43b. The amplitude limiter 40 introduces a fixed amplitude into the amplifier output. The generator therefore issues a square-wave voltage E corresponding to the characteristic shown in FIG. 8a, the amplitude being determined by the limiting device, and the half-wave period T being dependent upon the setting of the capacitors 13 and 14.

Figure 9:
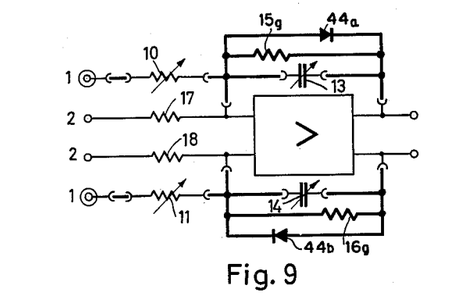
Figure 9A:
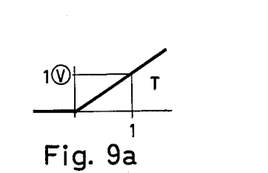

The circuit diagram shown in FIG. 9 is a model of a rectifier element according to the characteristic of FIG. 9a. The function plug connects the adjustable resistors 10 and 11 into the input circuit of the amplifier. The plug components further form two counter feedback circuits which comprise the adjustable capacitors 13 and 14 as well as resistors 15g, 16g and valves 44a and 44b. The components 15g, 16g, 44a, 44b are built into the function plug.

Figure 10:
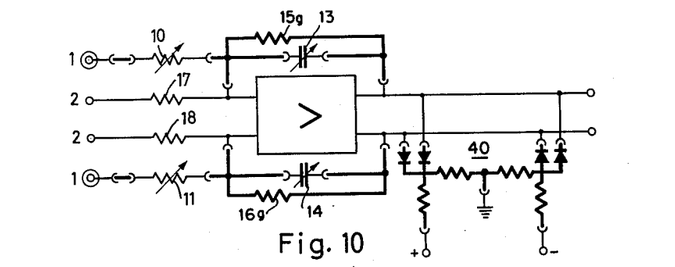
FIGS. 10 to 12 are schematic circuit diagrams of three further plug and model-unit connections for simulating respectively different functions.
Figure 10A:
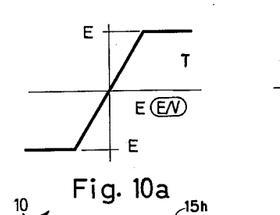

The circuit diagram of the function plug shown in FIG. 10 simulates a saturation characteristic as typified by FIG. 10a. The components and connections according to FIG. 10 correspond to those of FIG. 9, except that the valves 44a and 44b are omitted, and an amplitude limiter 40 corresponding to the one described above with reference to FIG. 8 is connected to the amplifier output circuit.

Figure 11:
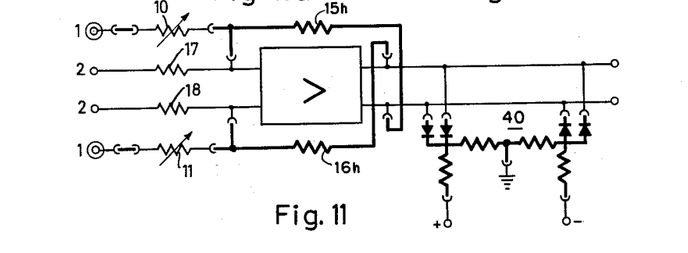
Figure 11A:
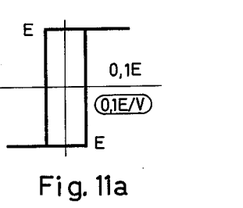

The circuit diagram shown in FIG. 11 forms a model of a two-point regulator whose typical characteristic is shown in FIG. 11a. The resistors 15h and 16h contained in the function plug provide for feedback coupling of the amplifier, and a current limiter 40, also mounted in the function plug, is used for assigning to the regulator model a definite amplitude level.

Figure 12:
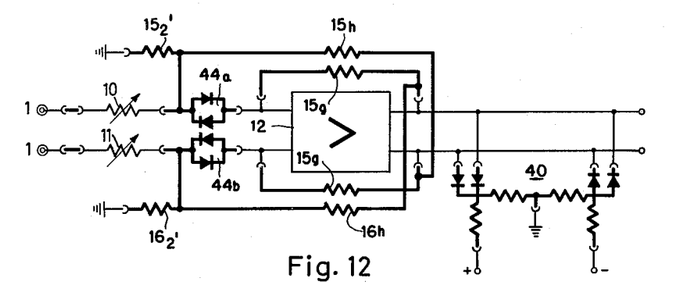

FIG. 12 illustrates the circuit connection of a three-point regulator. The circuit diagram corresponds to that of FIG. 11 but is supplemented as follows. The input circuit of the amplifier 12 comprises two threshold members 44a and 44b consisting each of two anti-parallel connected half-wave rectifiers (valves). Connected to the input terminals of these two threshold members are resistors 15i and 16i whose respective other terminals are grounded. These resistors are mounted in the function plug together with two counter-coupling resistors 15g and 16g corresponding to those mentioned above with reference to FIGS. 9 and 10. A three-point regulator characteristic as obtained with a function plug according to FIG. 12 is shown in FIG. 12a.

The performance characteristics according to FIGS. 9a to 12a are no longer transitional functions but represent the static characteristics of the respective models. For example, FIG. 9a represents the known characteristic of an ideal rectifier having an infinite blocking resistance and a definite, finite forward resistance whose magnitude can be adjusted with the aid of the selector switch 7, 8 which sets the amplification factor V for the input terminals 1 or 4. Furthermore, the model according to FIG. 9 can simulate inertia as is indicated by the letter T in FIG. 9a.

FIG. 10a represents an ideal saturation characteristic with maximum values ±E, which are determined by the action of the limiter 40. The saturation knee for the input terminals 1 or 4 is displaceable by varying the amplification V with the aid of switch 7, 8. A desired inertia value T can also be adjusted.

Figure 12A:
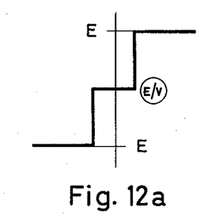

The characteristics according to FIGS. 11a and 12a indicate that the width of the loop in the two-point regulator according to FIG. 11, and the critical response limit of the three-point regulator according to FIG. 12 can be adjusted by means of the amplification control switch 7, 8. In both cases the maximum value of the amplitude E is determined by the limiter 40.

Figure 13:
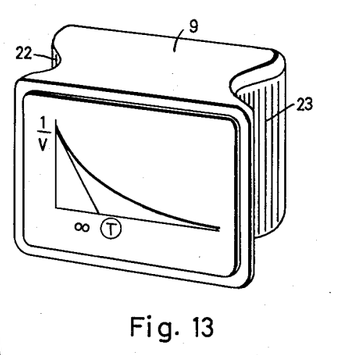

Since in a device according to the invention all the various functions are visibly exhibited on the cover of the function plug, the properties of the control or regulating circuit simulated by the model unit is apparent at any time. For example, FIG. 13 shows an embodiment of a function plug 9 for the purpose of simulating a yielding or drooping characteristic as explained above with reference to FIGS. 6 and 6a, and is applicable for return-feedback or return-to-zero purposes. As apparent from FIG. 13, the housing or cover of the function plug is preferably provided on both sides with recesses 22 and 23, preferably having a rippled surface, so that the plug can be safely and easily manipulated.

Figure 14:
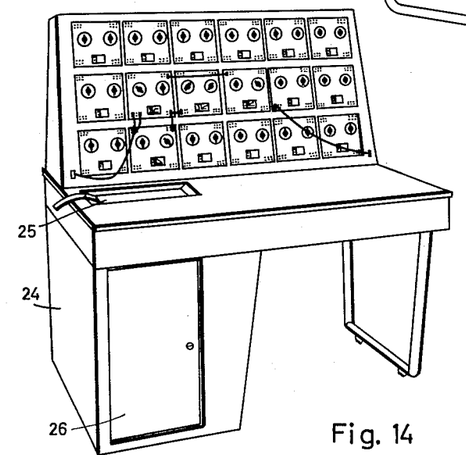
FIG. 14 illustrates perspectively an embodiment of a complete analog computer of the desk type, comprising a multiplicity of selectively applicable model units according to FIGS. 1 to 13.

An analog computer for investigation of regulating problems can be composed of a number of the described model units by giving the entire assembly a desk-type design such as exemplified in FIG. 14. The lower portion of the desk, beneath its top, comprises the current supply means for connection to a utility line, as well as the transmitter for supplying datum values and error signals to the model units. Built into the portion top of the desk is a high-speed recorder 25 for indicating the resulting transition characteristic determined by the computer output. A cabinet with a door 26 is provided for storing a supply of different function plugs and connecting cables. If the number of available model units is not sufficient for investigating a complicated regulating problem, a plurality of such desks can be interconnected by plugged-in cables in the same manner as the individual model units of the illustrated desk can be interconnected.

Figure 15:
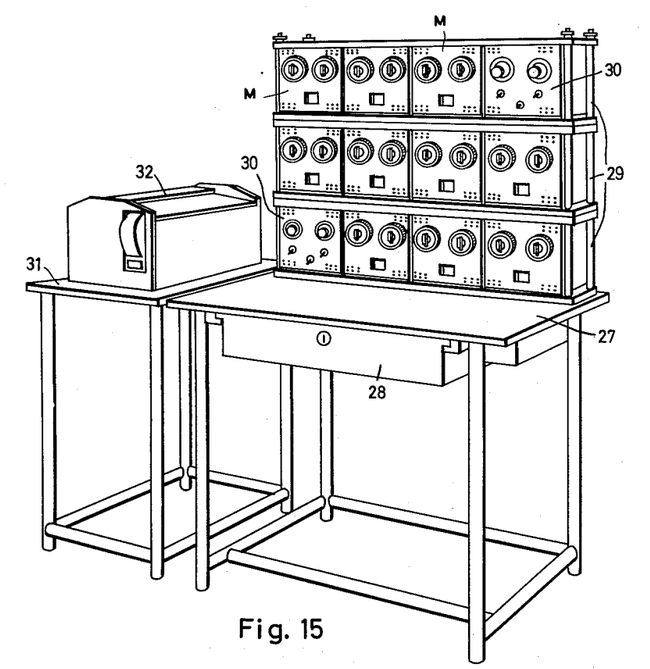
FIG. 15 is a perspective view of another embodiment of a computer comprising a number of model units.

According to a modified design of computers according to the invention, the power-supply units are given the same size and modular design as the above-described model units so that the power supply units and the model units can be mounted one beside the other in a supporting frame, and several such frames or rows can be mounted one above the other. This results in a rack or cabinet-type design depending upon the number of units to be used. Such a computer with ten model units M and two power-supply units 30 is illustrated in FIG. 15. A table 27 with a drawer 28 for storing the function plugs, supports three mounting frames 29 one above the other. The model units M and the two power-supply units 30 are mounted on the frames. The power-supply units 30 furnish on the one hand the operating voltages for the direct-current amplifiers (12 in FIGS. 2 to 12) and also the datum values and signal values (input voltages) required for operating the model units. Shown in FIG. 15 is further a high-speed recorder 32 mounted on a separate table 31 for recording the resulting transitional characteristic.

For investigating simpler regulating problems it is also possible to mount only a few model units together with a current supply unit on a table or desk.

When using a computer composed of model units according to the invention it is important, as with other computing devices, to provide for proper programming. By virtue of the invention, however, such programming is a simple and natural procedure resulting readily from the particular regulating program to be investigated. This is because it is only necessary to set up the schematic block diagram of the regulating system being investigated. Such a block diagram can immediately be transferred to the regulator model by placing the function plugs that correspond to the block diagram into the required number of model units. The interconnection of the individual model units then is effected in accordance with the active flow path apparent from the block diagram by plugging external cables into the proper input and output sockets. By virtue of the symmetrical amplifier, any changes in sign (plus, minus) can be taken into account simply by reversing the poling of the cable plugs. With some practice, the schematic block diagram need not even be drawn up but can directly be set up in the computer.

Figure 16:
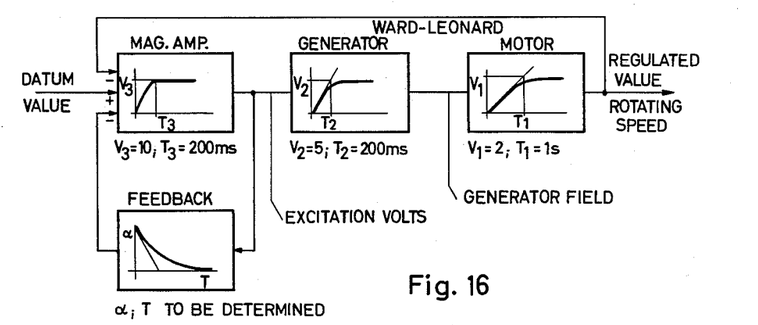
FIG. 16 is an explanatory block diagram representing an example of a computer set-up for a specific regulating problem.

The following example will illustrate the foregoing. FIG. 16 shows a schematic block diagram of a Ward-Leonard drive which is regulated by means of a magnetic amplifier. The magnetic amplifier is provided with a return control or feedback whose characteristic optimum magnitudes $\alpha = 1/V$ and T are to be determined, V denoting amplification and T denoting time constant. In the block diagram of FIG. 16 the individual transitional characteristics of the elements of the regulating system are shown, and the amplification values (V) and time constants (T) are entered.

Figure 17:
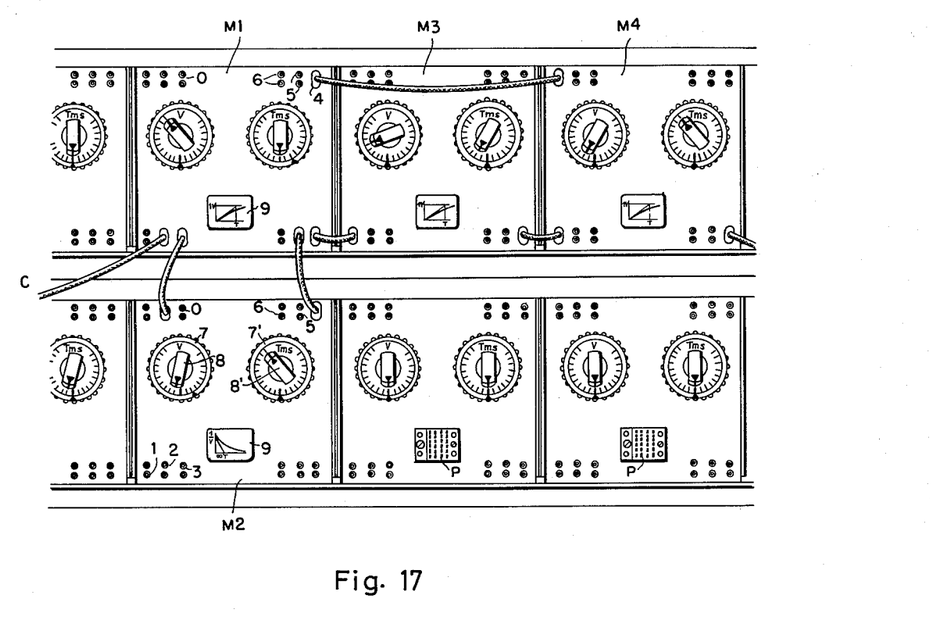
FIG. 17 is a front view of part of a computer and shows the interconnections and functioning plugs required for setting the computer in accordance with the scheme of FIG. 16.

FIG. 17 shows how this block diagram is set up in the model-unit computer. A model unit M1 is provided with a function plug 9 corresponding to the characteristic of the magnetic amplifier. Connected with unit M1 is a unit M2 that corresponds to the zero-return feedback of the magnetic amplifier. The output terminals of unit M1 are further connected with a unit M3 representing the generator of the Ward-Leonard set, and the unit M3 is connected with a model unit M4 representing the motor of the Ward-Leonard set. The output from unit M4 is available for recording the over-all behavior of the entire drive system, and this behavior, manifested by a corresponding output voltage, is indicated or recorded by means of the above-mentioned recording instrument. The two switches, 7, 8 and 7', 8' of the unit M2 are to be displaced until the instrument records the desired optimum of transitional characteristic. The cable for supplying the datum voltage for the regulating operation is shown in FIG. 17 at C.

Figure 18:
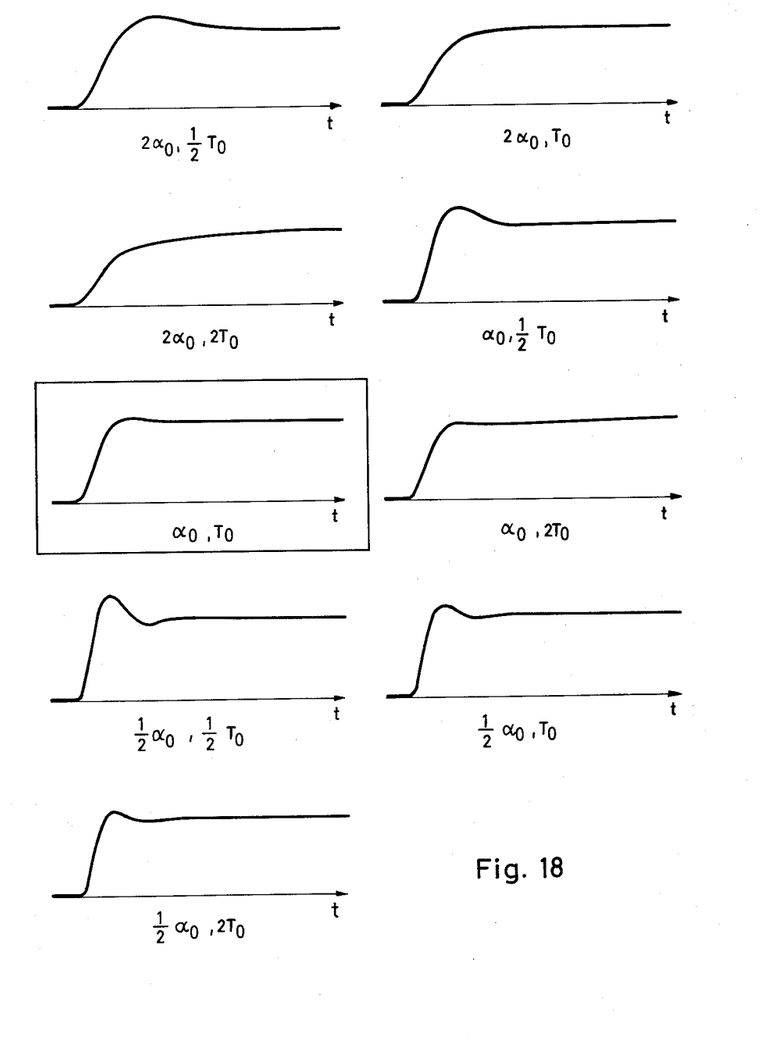
FIG. 18 illustrates a family of nine different transitional functions as obtained with the computer set-up shown in FIGS. 16 and 17.

FIG. 18 illustrates the coordinate diagrams of nine different transitional characteristics as obtained with a set-up as described above with reference to FIGS. 16 and 17. In these diagrams, the abscissa denotes time ($t$) and the ordinate indicates voltage amplitude. By varying the input voltage, the characteristics are varied and may assume any of the different forms shown in FIG. 18. The optimum parameters are denoted by $\alpha_0$ and $T_0$, and the diagram corresponding to these optima is identified by an enclosing rectangle. The transitional characteristics resulting from the varying of these parameters are designated by the correspondingly different parameter values.

Instead of recording the results by means of high-speed recorders, it is also possible to let the error magnitude act periodically and to use a synchronized oscillograph of suitable after-glow duration in order to obtain a static image of the performance being investigated. For thus periodically applying the error voltage, there may be used a model unit as described above with a plugged-in function plug that makes this unit operate as a square-wave generator, for example, according to FIGS. 8 and 8a.

A multi-unit analog computer according to the invention can be supplemented by other auxiliary devices, for example by multipliers which, with respect to their impedance ratios, are adapted to the model units. Furthermore, static and dynamic function generators may be used for cooperation with the model units.

It will be obvious to those skilled in the art, upon a study of this disclosure, that the principles and features of our invention permit of various modifications and arrangements of the components to be used and hence may be embodied in devices other than those particularly illustrated and shown herein, without departing from the essence of the invention and within the scope of the claims annexed hereto.

We claim:
1. An analog computer for experimental investigation of control and regulating systems, comprising a model unit having a mounting structure and having electric circuit components for forming an analog model of one of the functional elements respectively of the system to be investigated, said circuit components comprising an amplifier and adjustable impedance devices mounted on said structure, input and output terminals and a multiple-contact plug-in-socket field all accessibly mounted on said structure, said output terminals being electrically connected with the output side of said amplifier, the contacts of said plug-in-socket field being electrically connected respectively with said input and output terminals of said model unit and with the input and output sides of said amplifier and with said adjustable impedance devices, a number of exchangeable function plugs for simulating respectively different performance characteristics of said system element, said plugs being selectively insertable, one at a time, in said socket field for interconnecting said components in accordance with the performance characteristic to be simulated, each of said plugs containing conductor means and fixed impedance means interconnecting selected contacts of said function plug and, when said plug is inserted, forming together with said adjustable impedance devices a network connected with the input and output sides of said amplifier, said conductor means and said fixed impedance means of said function plug determining the layout of said network and hence the qualitative behavior of said model unit, and said adjustable impedance devices determining the quantitative behavior of said model unit in accordance with the performance characteristic of the particular system element to be simulated.

2. In an analog computer according to claim 1, said adjustable impedance devices of each model unit consisting of adjustable resistor means and separately adjustable capacitor means.

3. In an analog computer according to claim 2, one of said function plugs having its conductor means connecting said adjustable resistor means serially in the input circuit of said amplifier when said plug is inserted in said socket field.

4. In an analog computer according to claim 2, one of said function plugs having its conductor means connecting said adjustable capacitor means in feedback connection between the output and input circuits of said amplifier when said plug is inserted in said socket field.

5. In an analog computer according to claim 2, one of said function plugs having its conductor means connecting said adjustable resistor means in the input circuit of said amplifier, and connecting said adjustable capacitor means in feedback relation between the output and input circuits of said amplifier, said plug containing resistors connected parallel to said capacitor means and forming RC members therewith when said plug is inserted in said socket field.

6. In an analog computer according to claim 2, one of said function plugs having its conductor means connecting said adjustable resistor means in the input circuit of said amplifier, and connecting said adjustable capacitor means in feedback relation between the output and input circuits of said amplifier, and said plug containing resistors of which each is connected between one of the input terminals respectively of said amplifier and one of the respective output terminals of said amplifier when said plug is inserted in said socket field.

7. In an analog computer according to claim 2, one of said function plugs having its conductor means connecting said adjustable resistor means in the input circuit of said amplifier, and connecting said adjustable capacitor means in feedback relation between the output and input circuits of said amplifier, said plug containing first resistors of which each is connected between one of the input terminals respectively of said amplifier and one of the respective output terminals of said amplifier, and said plug containing second resistors connected in series with said adjustable capacitance means to form RC members together therewith.

8. In an analog computer according to claim 2, one of said function plugs having its conductor means connecting said adjustable resistor means in the input circuit of said amplifier, and connecting said adjustable capacitor means in feedback relation between the output and input circuits of said amplifier, said plug containing resistors connected parallel to said capacitor means and forming RC members therewith when said plug is inserted in said socket field, and rectifier means mounted in said plug and connected in mutually opposed polarity relation across said respective RC members.

9. In an analog computer according to claim 2, one of said function plugs having its conductor means connecting said adjustable capacitor means in feedback connection between the output and input circuits of said amplifier when said plug is inserted in said socket field, and four resistors and four rectifiers all mounted in said plug and connected, when said plug is inserted in said socket field, with the output circuit of said amplifier in amplitude limiter connection.

10. In an analog computer according to claim 2, one of said function plugs having its conductor means connecting said adjustable resistor means serially in the input circuit of said amplifier when said plug is inserted in said socket field, said plug containing two resistors of which each is connected between one of the input terminals respectively of said amplifier and one of the respective output terminals of said amplifier, and said plug containing four additional resistors and four rectifiers all mounted in said plug and connected, when said plug is inserted in said socket field, with the output circuit of said amplifier in amplitude limiter connection.

11. In an analog computer according to claim 10, said function plug comprising two threshold members connected in the amplifier input circuit when said plug is inserted to determine a threshold value for the amplifier input magnitude, and said plug having two further resistors which connect ground to the input sides of said respective threshold members.

12. In an analog computer according to claim 2, one of said function plugs having its conductor means connecting said adjustable capacitor means serially in the input circuit of said amplifier when said plug is inserted in said socket field.

13. In an analog computer according to claim 2, one of said function plugs having its conductor means connecting said adjustable capacitor means serially in the input circuit of said amplifier when said plug is inserted in said socket field, and connecting said adjustable resistors in feedback connection between output and input circuits of said amplifier.

14. In an analog computer according to claim 1, said adjustable impedance devices of each model unit consisting of adjustable resistor means and adjustable capacitor means, said impedance means of said plug comprising two first resistors and two second resistors, said two first resistors forming together with said adjustable capacitor means a feedback circuit between input and output of said amplifier, and said second resistors being connected between said input and output in counter feedback relation to said feedback circuit, and said plug having four additional resistors and four rectifiers all mounted in said plug and connected, when said plug is inserted in said socket field, with the output circuit of said amplifier in amplitude limiter connection.

15. In an analog computer according to claim 1, each of said exchangeable function plugs having a front surface, and having on said surface a diagram of the particular performance characteristic simulated by said impedance means.

16. In an analog computer according to claim 1, each of said exchangeable function plugs having a cover which encloses said impedance means and has inwardly bulging side walls for manual handling of the plug, said cover having a front wall provided with a diagram of the particular performance characteristic simulated by said impedance means.

17. In an analog computer according to claim 1, said mounting structure of each model unit having a vertical front panel on which said socket field and said input and output terminals are located, said input terminals comprising a plurality of input sockets connected with the input side of said amplifier for constant amplification.

18. In an analog computer according to claim 17, some of said input terminals and output terminals being mounted along the top of said panel, and the other input terminals and output terminals being mounted along the bottom of said panel.

19. In an analog computer according to claim 18, said mounting structure of each model unit having a rear wall and having additional sockets mounted on said rear wall to permit selective attachment of additional circuit components for widening the range of adjustment of said adjustable impedance means.

20. In an analog computer according to claim 1, each of said model units comprising two manual adjusting devices mounted on said structure and mechanically connected with said respective adjustable impedance means for adjusting the latter, each adjusting device having a rotatable ring and a rotatable knob coaxially surrounded by said ring for decadic coarse and fine adjustment respectively.

21. An analog computer according to claim 1, comprising a desk structure having a table top and a rear portion upwardly protruding from said top and comprising said number of model units disposed in horizontal rows, one row above the other, and power and signal supply means mounted in said desk structure beneath said top.

22. An analog computer according to claim 1, comprising current-supply units for connection of said model units to a power supply and for supplying them with datum and error signals, said current supply units having the same dimensions as said model units and being mounted in a row together with said model units.

References Cited in the file of this patent

UNITED STATES PATENTS

| | | |
|---|---|---|
| 2,894,688 | Robinson | July 14, 1959 |
| 2,918,218 | Thomas et al. | Dec. 22, 1959 |
| 2,950,862 | Bubb | Aug. 30, 1960 |

OTHER REFERENCES

"Transistor Circuits for Analog and Digital Systems" (Blecher), Bell System Tech. Journal, March 1956, page 309 relied on.